(12) United States Patent
Millich et al.

(10) Patent No.: US 10,557,422 B2
(45) Date of Patent: Feb. 11, 2020

(54) AIR CHARGE DETERMINATION METHOD, ENGINE CONTROL UNIT AND INTERNAL COMBUSTION ENGINE

(71) Applicant: Volkswagen Aktiengesellschaft, Wolfsburg (DE)

(72) Inventors: Elmar Millich, Berlin (DE); Lars Petersen, Meinersen (DE); Andre Shurkewitsch, Calberlah (DE); Jan Vogelsang, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 19 days.

(21) Appl. No.: 15/837,165

(22) Filed: Dec. 11, 2017

(65) Prior Publication Data

US 2018/0100451 A1    Apr. 12, 2018

Related U.S. Application Data

(63) Continuation of application No. PCT/EP2016/062363, filed on Jun. 1, 2016.

(30) Foreign Application Priority Data

Jun. 12, 2015   (DE) .......................... 10 2015 210 761

(51) Int. Cl.
  *F02D 35/02*    (2006.01)
  *F02D 41/30*    (2006.01)
  (Continued)

(52) U.S. Cl.
  CPC ....... *F02D 35/024* (2013.01); *F02D 41/3005* (2013.01); *G01F 22/02* (2013.01);
  (Continued)

(58) Field of Classification Search
  CPC ............... F02D 35/024; F02D 41/3005; F02D 41/1448; F02D 2200/704;
  (Continued)

(56) References Cited

U.S. PATENT DOCUMENTS

| | | | |
|---|---|---|---|
| 6,422,202 B1* | 7/2002 | Wild ..................... | F02D 11/105 123/399 |
| 9,617,930 B2* | 4/2017 | Kang .................. | F02D 41/0002 |

(Continued)

FOREIGN PATENT DOCUMENTS

| | | |
|---|---|---|
| DE | 197 53 873 A1 | 6/1999 |
| DE | 10 2005 027 470 A1 | 1/2006 |

(Continued)

OTHER PUBLICATIONS

Search Report including Provisional Assessment of Patentability issued by the German Patent and Trademark Office for German Patent Application No. DE 10 2015 210 761.2, dated Feb. 16, 2016.

(Continued)

*Primary Examiner* — Joseph J Dallo
(74) *Attorney, Agent, or Firm* — Manfred Beck, P.A.

(57) ABSTRACT

A method for determining a quantity of air within a cylinder of an internal combustion engine includes the steps of scaling an intake manifold pressure and an exhaust gas pressure in dependence on an actual ambient air pressure and a standard ambient air pressure in order to provide a scaled intake manifold pressure and a scaled exhaust gas pressure, implementing an air charge calculating algorithm produced under a standard ambient air pressure operating condition, in order to determine a standard quantity of air based on the scaled intake manifold pressure and the scaled exhaust gas pressure, and scaling the standard quantity of air in dependence on the actual ambient air pressure and the standard ambient air pressure in order to calculate the (Continued)

quantity of air within the cylinder of the internal combustion engine. An engine control unit and a method for controlling an internal combustion engine are also provided.

20 Claims, 2 Drawing Sheets

(51) Int. Cl.
G01F 22/02 (2006.01)
F02D 41/26 (2006.01)
(52) U.S. Cl.
CPC ...... F02D 41/26 (2013.01); F02D 2200/0408 (2013.01); F02D 2200/704 (2013.01)
(58) Field of Classification Search
CPC ............ F02D 2200/0408; F02D 41/26; F02D 13/0261; F02D 41/0007; F02D 2200/703; F02D 2200/0406; F02D 2200/0402; F02D 41/18; G01F 22/02
See application file for complete search history.

(56) References Cited

U.S. PATENT DOCUMENTS

| | | | |
|---|---|---|---|
| 2003/0105575 A1* | 6/2003 | Haskara | F02D 41/0062 701/101 |
| 2005/0000217 A1* | 1/2005 | Nau | F01N 3/2006 60/612 |
| 2005/0274357 A1 | 12/2005 | Matthews et al. | |
| 2007/0012040 A1 | 1/2007 | Nitzke et al. | |
| 2007/0056546 A1* | 3/2007 | Trask | F01L 9/04 123/179.18 |
| 2007/0157715 A1 | 7/2007 | Boehm et al. | |
| 2007/0227500 A1 | 10/2007 | Dingl et al. | |
| 2009/0070009 A1 | 3/2009 | Delp | |
| 2011/0232614 A1* | 9/2011 | Emerick | F02M 26/16 123/568.17 |
| 2012/0291534 A1* | 11/2012 | Wang | F02D 41/0002 73/114.52 |
| 2012/0296546 A1* | 11/2012 | Wang | F02D 41/0002 701/101 |
| 2014/0345255 A1* | 11/2014 | Zhu | F02B 37/22 60/273 |
| 2016/0186676 A1 | 6/2016 | Burkhardt et al. | |
| 2017/0037803 A1* | 2/2017 | Surnilla | F02D 41/064 |

FOREIGN PATENT DOCUMENTS

| | | |
|---|---|---|
| DE | 10 2004 030 604 B3 | 2/2006 |
| DE | 10 2004 041 708 A1 | 3/2006 |
| DE | 10 2007 012 340 B3 | 5/2008 |
| DE | 10 2007 012 506 A1 | 9/2008 |
| DE | 10 2007 035 314 A1 | 1/2009 |
| DE | 10 2007 043 440 B3 | 4/2009 |
| DE | 10 2008 042 819 A1 | 4/2010 |
| DE | 10 2013 216 073 A1 | 2/2015 |
| DE | 10 2014 214 438 B3 | 8/2015 |
| EP | 1 715 163 A1 | 10/2006 |

OTHER PUBLICATIONS

International Search Report for International Application No. PCT/EP2016/062363 and translation thereof, dated Aug. 17, 2016.
International Preliminary Report on Patentability for International Application No. PCT/EP2016/062363 including Written Opinion of the International Searching Authority and translation thereof, dated Dec. 17, 2017.

* cited by examiner

AIR CHARGE DETERMINATION METHOD, ENGINE CONTROL UNIT AND INTERNAL COMBUSTION ENGINE

CROSS-REFERENCE TO RELATED APPLICATIONS

This application is a continuation, under 35 U.S.C. § 120, of copending International Application No. PCT/EP2016/062363, filed Jun. 1, 2016, which designated the United States; this application also claims the priority, under 35 U.S.C. § 119, of German Patent Application No. DE 10 2015 210 761.2, filed Jun. 12, 2015; the prior applications are herewith incorporated by reference in their entirety.

BACKGROUND OF THE INVENTION

Field of the Invention

The present invention relates to a method for determining a quantity of air within a cylinder of an internal combustion engine, an engine control unit which is configured to implement the method, and an internal combustion engine that includes the engine control unit.

In an internal combustion engine, for example an Otto-cycle engine, a mixture of fuel and oxygen which is present in the ambient air is burned in a controlled manner. In order to make an optimal combustion possible, it is advantageous to adjust the quantity of fuel, for example per injection, to the quantity of air that is located in the combustion chamber of the internal combustion engine, in particular in the cylinder of an Otto-cycle engine.

Consequently, in particular in the case of Otto-cycle engines, (but also in the case of other internal combustion engines such as diesel engines or gas turbines), it is important to ascertain as precisely as possible the cylinder air charge present during operation (in other words the quantity of air which is present in the cylinder prior to ignition or prior to fuel being supplied). It is thus possible to feed a corresponding quantity of fuel or fuel mass into the cylinder chamber on the basis of the cylinder air charge with the result that in particular it is possible to set a stoichiometric air-fuel ratio in the case of the cylinder air charge (or oxygen charge which is present in the cylinder). It is thereby possible for example to achieve a desired λ-value of 1 (or another value) in order in particular to minimize exhaust gas pollutant emissions and optimize the combustion or performance.

Conventionally, it is possible to calculate the cylinder air charge in general from a measured or modeled intake manifold pressure (also known as charge-air pressure which corresponds to the pressure of the air which is fed to the cylinder), an exhaust gas back pressure (also known as exhaust gas pressure which represents the pressure of the exhaust gas in an exhaust pipe) and models for a residual gas portion in the cylinder.

There are calculating algorithms in which the prevailing positions of actuators which affect the charge (for example inlet cam shafts and outlet cam shafts, charge movement flaps, valve lifts and others) are input, and also intake air temperatures and exhaust gas temperatures. Inaccuracies in the models can be corrected by virtue of the fact that in the correction fields of the corresponding engine control software are supplied with data on the basis of extensive, time-consuming engine test bench measurements. Environmental factors such as pressure and temperature can also have an effect on the actual and the calculated cylinder air charge.

Since the above-mentioned inputting of data into the correction fields generally occurs on the test bench under standard conditions with respect to pressure and temperature (for example at 1013 mbar and 21° C.), it is possible when operating the vehicle under other ambient pressure conditions (for example when operating at various altitudes above sea level) for considerable discrepancies to occur between the calculated and the actual quantity of air present in the cylinder.

This can be taken into account by means of additional correction characteristic maps in the engine control software, the additional correction fields being adjusted when testing the vehicles at different ambient pressures. Above all, in supercharged engines having an exhaust gas turbine (which pre-compresses the supply of air that is fed into the cylinder), it is possible for powerful oscillations to occur in the exhaust gas pressure upstream of the turbine over the operating cycle. The averaged exhaust gas pressure which is included in the calculation of the quantity of air present in the cylinder via the residual gas content in the cylinder is therefore often not sufficient for precisely calculating the cylinder air charge, and further variables such as the measured or modeled exhaust gas pressure downstream of the turbine are required for determining the cylinder air charge.

The basic inputting of data (basic engine precalibration) when ascertaining the air charge under standard ambient conditions on the engine test bench can be performed systematically across all operating points and actuator positions which are relevant to the charge value. In order to perform the corrections to the input data which are necessary as a result of the ambient pressure during vehicle testing, usually only one small part of the drivable operating points is ascertained. Discrepancies between the real and the calculated cylinder air charge cannot therefore be entirely avoided in series operation. The customary data input corrections under different ambient pressure conditions are moreover often time-consuming and cost-intensive.

German Patent No. DE 10 2004 030 604 B3 discloses a method for determining the air mass in a cylinder of an internal combustion engine having a supercharging device and a device for variably controlling the valve overlap of the gas exchange valves. A reference characteristic curve for the air mass in the cylinder describes in dependence on the operating conditions a linear correlation between the air mass in the cylinder and the pressure in the intake manifold. If the intake manifold pressure exceeds the exhaust gas back pressure, the value of the air mass from the reference characteristic curve is corrected using a value for the trapping efficiency which is defined as a characteristic curve dependent on operating conditions over the pressure in the air intake tract.

German Patent No. DE 10 2007 012 340 B3 discloses a method for determining and adjusting the air mass flow in the intake manifold of an internal combustion engine. A model air mass flow is modeled and is adjusted with at least an air mass flow which is determined by means of a measurement performed in the air intake tract upstream of the intake manifold. Namely by virtue of the fact that the control deviation between the model air mass flow and the air mass flow, which is determined by means of performing a measurement, is influenced in a single adjustment branch with the aid of a generalized adaptation, the adaptation including only a temporal behavior relating to how rapidly a control error between the model air mass flow and the air mass flow which is determined by means of measuring is to be compensated. Moreover, an adaptation target variable is produced and is transformed by means of a subsequent adaptation value transformation in the same adjustment branch to form a physical variable of the intake manifold.

German Patent Application Publication No. DE 10 2007 012 506 A1 discloses a method for determining and adjusting the air mass flow in the intake manifold of an internal combustion engine, wherein an air mass flow model models a model air mass flow through the throttle device (restrictor device) of the intake manifold, wherein the air mass flow of fresh air which flows into the air intake tract is measured by means of a sensor upstream of the throttle device, wherein the measured air mass flow is transformed into an air mass flow which is hypothetically measured at the location of the throttle device and the transformed air mass flow is compared with the model air mass flow through the throttle device.

Known methods and devices for determining a cylinder air charge are either particularly complex in terms of the features required, time-consuming and/or cost-intensive or do not always offer the desired accuracy and/or reliability in all operating conditions.

SUMMARY OF THE INVENTION

It is accordingly an object of the invention to provide a method for determining a quantity of air within a cylinder of an internal combustion engine which at least in part overcomes or rectifies the above-mentioned problems in the prior art.

Another object of the invention is to provide an engine control unit and an internal combustion engine having an engine control unit of this type which is capable of determining a cylinder air charge in a reliable and sufficiently precise manner with acceptable expenditure in terms of cost and time. A further object of the invention is to provide a method for controlling an internal combustion engine.

With the foregoing and other objects in view there is provided, in accordance with the invention, a method for determining a quantity of air within a cylinder of an internal combustion engine, the method including the steps of:

scaling an intake manifold pressure and an exhaust gas pressure in dependence on an actual ambient air pressure and a standard ambient air pressure in order to provide a scaled intake manifold pressure and a scaled exhaust gas pressure;

implementing an air charge calculating algorithm produced under a standard ambient air pressure operating condition, in order to determine a standard quantity of air based on the scaled intake manifold pressure and the scaled exhaust gas pressure; and scaling the standard quantity of air in dependence on the actual ambient air pressure and the standard ambient air pressure in order to calculate the quantity of air within the cylinder of the internal combustion engine.

In other words, according to the invention, there is provided a method for determining a quantity of air within a cylinder of an internal combustion engine, wherein the method includes scaling an intake manifold pressure and an exhaust gas pressure in dependence on an actual ambient air pressure and a standard ambient air pressure; implementing an air charge calculating algorithm that is produced under a standard ambient air pressure operating condition, in order to determine a standard quantity of air on the basis of the scaled intake manifold pressure and the scaled exhaust gas pressure; and scaling the standard quantity of air in dependence on the actual ambient air pressure and the standard ambient air pressure in order to calculate the quantity of air.

A method according to the invention for determining a quantity of air (in particular an air mass, number of air molecules or similar, in particular a quantity of oxygen, oxygen mass or number of oxygen molecules) within a cylinder (or within multiple cylinders which are filled with fresh air and fuel and ignited) of an internal combustion engine (for example an Otto-cycle engine, gasoline engine, diesel engine) includes scaling an intake manifold pressure (pressure of the air which is supplied to the cylinder, also known as charge-air pressure) and an exhaust gas pressure (pressure of the exhaust gas which flows out of the cylinder after combustion) in dependence on an actual ambient air pressure (in particular atmospheric pressure which prevails in the environment of the internal combustion engine) and a standard ambient air pressure (for example an air pressure of 1013 mbar, in particular in the case of a standard temperature, for example 21° C.).

Moreover, an air charge calculating algorithm is implemented, the calculating algorithm being produced under a standard ambient air pressure operating condition (for example an operating condition in which a pressure of 1013 mbar prevails and for example a temperature of 21° C. prevails), in order to determine a standard quantity of air (in particular a quantity of air which would be determined as being located in the cylinder in the standard ambient air pressure operating condition) on the basis of the scaled intake manifold pressure (which is obtained by scaling the intake manifold pressure) and the scaled exhaust gas pressure (which is obtained by scaling the exhaust gas pressure).

Finally, the standard quantity of air is scaled in dependence on the actual ambient air pressure and the standard ambient air pressure in order to calculate the quantity of air that is located within the cylinder.

The method can be implemented for example in an engine control unit of the internal combustion engine, in particular in a (software) module of the engine control unit. The method can be embodied as a method which can be implemented by a computer. The method can for example be programmed to run in the engine control unit. For this purpose, the engine control unit can access a storage device which includes instructions that are configured to implement the method for determining the quantity of air.

It is possible for the intake manifold pressure (also known as charge-air pressure) and/or the exhaust gas pressure to have been determined by measuring using suitable sensors or to a certain extent also by means of modeling.

The intake manifold pressure and the exhaust gas pressure can represent input variables for the method.

Moreover, the ambient air pressure can also represent an input variable for the method.

It is possible to scale the intake manifold pressure and the exhaust gas pressure differently or identically.

It is possible to scale the standard quantity of air differently than or identically to the scaling of the intake manifold pressure and/or the exhaust gas pressure.

The ambient air pressure can be measured or also to a certain extent modeled.

The air charge calculating algorithm can be implemented in a conventional engine control unit.

The air charge calculating algorithm may have been produced from physical/heuristic models with the aid of characteristic curves and using data which is determined experimentally. Normal or standard conditions, in particular a temperature of 21° C. and an ambient air pressure of 1013 mbar can be taken as a starting point. Under these conditions, it is possible for the internal combustion engine to have been measured with regard to a quantity of air which is located within the cylinder (in particular where there is a closed inlet valve) and in dependence on varying intake manifold pressure and exhaust gas pressure.

As a result, the air charge calculating algorithm can provide a standard quantity of air inputting an intake manifold pressure and an exhaust gas pressure, and the standard quantity of air would be contained within the cylinder if the standard ambient air pressure operating condition applies.

In particular, the method can determine the quantity of air which is located within the cylinder when there is a closed air inlet valve. The quantity of air which is located in the cylinder when the air inlet valve is closed is the quantity of air which is ultimately ignited in a mixture with a fuel which is added later. The quantity of air which is present in the cylinder at this point in time is therefore the quantity of air that is relevant for optimizing the combustion.

With the aid of the present invention, it is possible to use a conventionally available air charge calculating algorithm to determine a quantity of air in the case of an ambient air pressure that deviates from the standard ambient air pressure. For this purpose, only the intake manifold pressure and the exhaust gas pressure are scaled in dependence on the actual ambient air pressure and the standard ambient air pressure, the scaled variables are input into the air charge calculating algorithm and the quantity of air that is output by the air charge calculating algorithm is in turn scaled in dependence on the actual ambient air pressure and the standard ambient air pressure in order finally to calculate the quantity of air which is located in the cylinder at the actual ambient air pressure.

It is thereby possible to reliably and sufficiently precisely model and determine the quantity of air in a manner that is advantageous in terms of cost and time.

According to another mode of the invention, the steps of scaling the intake manifold pressure, the exhaust gas pressure and the standard quantity of air include a linear scaling.

The scaling of the intake manifold pressure, the exhaust gas pressure and the standard quantity of air can thus include linear scaling (in particular multiplying by a constant or variable factor). The method can thus be further simplified, in particular it is possible to reduce the memory requirement.

According to another mode of the invention, the steps of scaling the intake manifold pressure, the exhaust gas pressure and the standard quantity of air include a linear scaling and wherein, in order to calculate the quantity of air within the cylinder, the quantity of air located in the cylinder with the air inlet valve closed is determined.

In other words, the scaling of the intake manifold pressure, the exhaust gas pressure and the standard quantity of air includes scaling in a linear manner, wherein in particular the quantity of air which is located in the cylinder when there is a closed air inlet valve is determined.

According to a further mode of the invention, the step of scaling the intake manifold pressure and the exhaust gas pressure is performed in a uniform manner.

The scaling of the intake manifold pressure and the exhaust gas pressure can be performed in a uniform manner. In particular, the scaling of the intake manifold pressure and the exhaust gas pressure can be performed by applying the same function to the intake manifold pressure and the exhaust gas pressure. The function can include for example a non-linear function or a linear function. It is possible to further simplify the method by using the uniform scaling.

According to a further mode of the invention, the step of scaling the intake manifold pressure includes multiplying the intake manifold pressure by a factor, wherein the factor includes a quotient formed from the standard ambient air pressure and the actual ambient air pressure.

The scaling of the intake manifold pressure can include multiplying the intake manifold pressure by a factor, wherein the factor includes the quotient (or a reciprocal value of the factor) from the standard ambient air pressure and the actual ambient air pressure. Multiplication can be performed in a simple and rapid manner. The quotient can also be calculated in a simple manner from the standard ambient air pressure and the actual ambient air pressure.

According to another mode of the invention, the step of scaling the standard quantity of air includes multiplying the standard quantity of air by the reciprocal value of the factor.

Thus, the scaling of the standard quantity of air can include multiplying the standard quantity of air by the reciprocal value of the factor. The method can thereby be further simplified since a transformation of the different variables can be derived only from a single factor.

According to another mode of the invention, the step of implementing the air charge calculating algorithm includes using at least one input variable selected from the group including positions of actuators affecting a charge, a rotational speed of the internal combustion engine, an inlet cam position, an outlet cam position, a charge movement flap position, at least one valve lift, an exhaust gas temperature, an air supply temperature, a measured exhaust gas pressure downstream of a turbine, a modeled exhaust gas pressure downstream of a turbine and an ambient temperature.

The air charge calculating algorithm can include one or multiple further input variables, in particular positions (or settings) of actuators which affect the charge, and/or a rotational speed of the internal combustion engine and/or an inlet cam position and/or an outlet cam position and/or a charge movement flap position and/or at least one valve lift and/or an exhaust gas temperature and/or an air supply temperature (or charge-air temperature) and/or a measured or modeled exhaust gas pressure upstream of a turbine and/or an ambient temperature.

According to one embodiment, the further input variables include in particular at least a rotational speed of the internal combustion engine, an inlet cam position and an outlet cam position. These input variables can be determined conventionally or can be modeled with the result that a particular measuring device for implementing the method is not required.

The air charge calculating algorithm can include a number of characteristic curves or tables and/or model functions.

The air charge calculating algorithm can be generated on the basis of purely heuristic and/or on physical/technical models.

In a conventional engine control unit, the air charge calculating algorithm can determine from an input intake manifold pressure and an input exhaust gas pressure the quantity of air in the cylinder which would be present in the cylinder at a standard ambient air pressure.

According to another mode of the invention, in order to calculate the quantity of air within the cylinder of the internal combustion engine, the method supports a phase of a simultaneous opening of an inlet valve and an outlet valve of the cylinder. In other words, the method supports a phase of a concurrent opening of an inlet valve and an outlet valve of the cylinder.

The method according to the invention can support a phase (time phase) of simultaneously opening an inlet valve (which makes it possible to introduce air into the cylinder) and an outlet valve of the cylinder (the outlet valve making it possible to discharge exhaust gas out of the cylinder). During the phase of simultaneously opening the inlet valve and the outlet valve, on the one hand a part of the exhaust gas which is located in the cylinder after combustion flows out of the cylinder (in particular into an exhaust pipe) and on the other hand air (from an intake manifold or charge pipe) already enters the cylinder.

Such an operating phase impedes the procedure of determining the quantity of air within the cylinder if the inlet valve is closed again afterwards. The scaling or transformation of the relevant variables intake manifold pressure, exhaust gas pressure and quantity of air however can also be used in engine control procedures which include a phase of a simultaneous opening of an inlet valve and an outlet valve. The method can thereby be applied and used in a flexible manner in a large number of engine operating methods.

According to another mode of the invention, in order to calculate the quantity of air within the cylinder of the internal combustion engine, the method supports a residual gas recirculation.

Accordingly, the method can also support a residual gas recirculation procedure. Some of the air which flows into the cylinder during the simultaneous opening of the inlet valve and outlet valve can enter the exhaust pipe but in the further course of the air intake tract can be recirculated back into the cylinder. This operating mode can also complicate a calculation of the quantity of air. However, the method, as is further explained below using the physical analysis, can also be applied to this internal combustion engine control or internal combustion engine condition. Consequently, it is possible to apply the method to a multiplicity of operating methods of internal combustion engines.

According to a further mode of the invention, in order to calculate the quantity of air within the cylinder of the internal combustion engine, the method supports a flushing of a quantity of residual gas with fresh air.

According to another mode of the invention, the air charge calculating algorithm is a calculating algorithm produced on an internal combustion engine test bench under standard conditions over a plurality of operating points and actuator positions affecting a charge.

In particular, the air charge calculating algorithm is a calculating algorithm produced on an internal combustion engine test bench at a standard temperature over a plurality of operating points and actuator positions affecting a charge.

The air charge calculating algorithm can be produced on the internal combustion engine test bench under standard conditions, in particular at a standard temperature (for example 21° C.) and at standard ambient pressure (for example 1013 mbar), over a plurality of operating points and actuator positions which affect the charge value. For this purpose, a plurality of measurements (in particular intake manifold pressure, exhaust gas pressure and quantity of air) can be performed. Conventional methods for inputting data for engine-relevant algorithms can therefore be applied or used.

Another mode of the invention includes determining the intake manifold pressure in an intake manifold and the exhaust gas pressure in an exhaust pipe in each case by pressure measurements or modeling operations.

A particular mode of the invention includes determining the intake manifold pressure in an intake manifold and the exhaust gas pressure in an exhaust pipe in each case by averaging pressure measurements or modeling operations.

Another mode of the invention includes, determining the intake manifold pressure in an intake manifold when an air inlet valve of the cylinder is open and determining the exhaust gas pressure in an exhaust pipe in each case by pressure measurements or modeling operations.

Another mode of the invention includes determining the intake manifold pressure in an intake manifold and determining the exhaust gas pressure in an exhaust pipe when an exhaust gas outlet valve of the cylinder is open in each case by pressure measurements or modeling operations.

The intake manifold pressure and the exhaust gas pressure can in each case be determined by pressure measurements and/or modeling operations, in particular by averaging pressure measurements and modeling operations, in an intake manifold or in an exhaust pipe. In particular, this can occur when there is an opened air inlet valve and/or an opened exhaust gas outlet valve of the cylinder. Pressure measurements of this type can be implemented in conventional internal combustion engines by means of suitable sensors, even without having to change the configuration of the internal combustion engine. The method is thereby also suitable for conventional internal combustion engines.

Another mode of the invention includes obtaining the actual ambient air pressure by performing at least one step selected from the group including measuring a pressure, measuring an altitude and obtaining remotely determined meteorological data.

The actual ambient air pressure can be obtained or determined by means of a pressure measurement and/or altitude measurement and/or, where appropriate, also based on meteorological data which is determined remotely. These input variables are therefore determined in a flexible manner.

Moreover, the object of the invention is achieved by a method for controlling an internal combustion engine having at least one cylinder, wherein, when performing the control method, a method for determining a quantity of air within the cylinder is implemented according to one of the embodiments disclosed in this application.

Moreover, during the control method, fuel is introduced into the cylinder, wherein a quantity of fuel (for example mass, number of molecules) is selected on the basis of the determined quantity of air (for example mass, number of molecules, in particular oxygen) in particular in such a manner that a stoichiometric ratio between the fuel and the quantity of air or the quantity of oxygen (for example according to a reaction equation) is achieved within the cylinder.

Specifically, according to the invention, there is provided a method for controlling an internal combustion engine having at least one cylinder, the method including:

scaling an intake manifold pressure and an exhaust gas pressure in dependence on an actual ambient air pressure and a standard ambient air pressure in order to provide a scaled intake manifold pressure and a scaled exhaust gas pressure;

implementing an air charge calculating algorithm produced under a standard ambient air pressure operating condition, in order to determine a standard quantity of air based on the scaled intake manifold pressure and the scaled exhaust gas pressure;

scaling the standard quantity of air in dependence on the actual ambient air pressure and the standard ambient air pressure in order to calculate a quantity of air within the at least one cylinder of the internal combustion engine; and supplying fuel into the at least one cylinder, wherein a quantity of fuel is selected based on the quantity of air within the at least one cylinder of the internal combustion engine.

An engine control unit according to the invention includes an input module and a processor (for example including hardware and/or software). The input module is configured to obtain at least an intake manifold pressure and an exhaust gas pressure of a cylinder of an internal combustion engine and an actual ambient air pressure, or to make them available within the engine control unit. The processor is configured to scale the intake manifold pressure and the exhaust gas pressure in dependence on the actual ambient air pressure and a standard ambient air pressure, to implement an air charge calculating algorithm that is produced under a standard ambient air pressure operating condition in order to determine a standard quantity of air on the basis of the scaled intake manifold pressure (air supply pressure) and the scaled exhaust gas pressure. Moreover, the processor is configured to scale the standard quantity of air in dependence on the actual ambient air pressure and the standard ambient air pressure in order to determine a quantity of air within the cylinder. Finally, the processor is embodied so as to determine a quantity of fuel that is to be introduced into the cylinder on the basis of the determined quantity of air (in particular on the basis of a quantity of oxygen in the determined quantity of air). The engine control unit can be configured to implement or to control a method according to any one of the embodiments mentioned above.

In particular, according to the invention, there is provided an engine control unit, including:

an input module configured to obtain at least an intake manifold pressure and an exhaust gas pressure of a cylinder of an internal combustion engine and an actual ambient air pressure;

a processor configured to scale the intake manifold pressure and the exhaust gas pressure in dependence on the actual ambient air pressure and a standard ambient air pressure in order to provide a scaled intake manifold pressure and a scaled exhaust gas pressure;

the processor being configured to implement an air charge calculating algorithm produced under a standard ambient air pressure operating condition, in order to determine a standard quantity of air based on the scaled intake manifold pressure and the scaled exhaust gas pressure;

the processor being configured to scale the standard quantity of air in dependence on the actual ambient air pressure and the standard ambient air pressure in order to determine a quantity of air within the cylinder of the internal combustion engine; and the processor being configured to determine, based on the quantity of air within the cylinder of the internal combustion engine, a quantity of fuel to be introduced into the cylinder of the internal combustion engine.

The engine control unit can in particular be configured to implement a method for determining a quantity of air within a cylinder of an internal combustion engine according to any one of the disclosed embodiments.

An internal combustion engine according to the invention (for example an Otto-cycle engine, gasoline engine or diesel engine and optionally including an additional electric motor) includes at least one cylinder having an intake manifold and an exhaust pipe and an engine control unit according to any one of the disclosed embodiments. The engine control unit is configured to determine a quantity of air in the cylinder, and on the basis of the quantity of air to determine a quantity of fuel which is ultimately introduced into the cylinder so as to be burned together with the quantity of air. The engine control unit can control for this purpose for example a fuel pump and an inlet valve.

With the object of the invention in view there is accordingly also provided an internal combustion engine, including:

at least one cylinder having an intake manifold and an exhaust pipe;

an engine control unit having an input module and a processor;

the input module being configured to obtain at least an intake manifold pressure and an exhaust gas pressure of a cylinder of an internal combustion engine and an actual ambient air pressure;

the processor being configured to scale the intake manifold pressure and the exhaust gas pressure in dependence on the actual ambient air pressure and a standard ambient air pressure in order to provide a scaled intake manifold pressure and a scaled exhaust gas pressure;

the processor being configured to implement an air charge calculating algorithm produced under a standard ambient air pressure operating condition, in order to determine a standard quantity of air based on the scaled intake manifold pressure and the scaled exhaust gas pressure;

the processor being configured to scale the standard quantity of air in dependence on the actual ambient air pressure and the standard ambient air pressure in order to determine a quantity of air within the cylinder of the internal combustion engine; and the processor being configured to determine, based on the quantity of air within the cylinder of the internal combustion engine, a quantity of fuel to be introduced into the cylinder of the internal combustion engine.

Further particular embodiments and advantageous embodiments of the invention are specified in the dependent claims and are explained in the detailed description hereinunder of preferred embodiments of the present invention. Embodiments of the present invention are explained with reference to the attached drawing. The scope of the claims is not intended to be limited to the described or illustrated embodiments.

Although the invention is illustrated and described herein as embodied in an air charge determination method, an engine control unit and an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
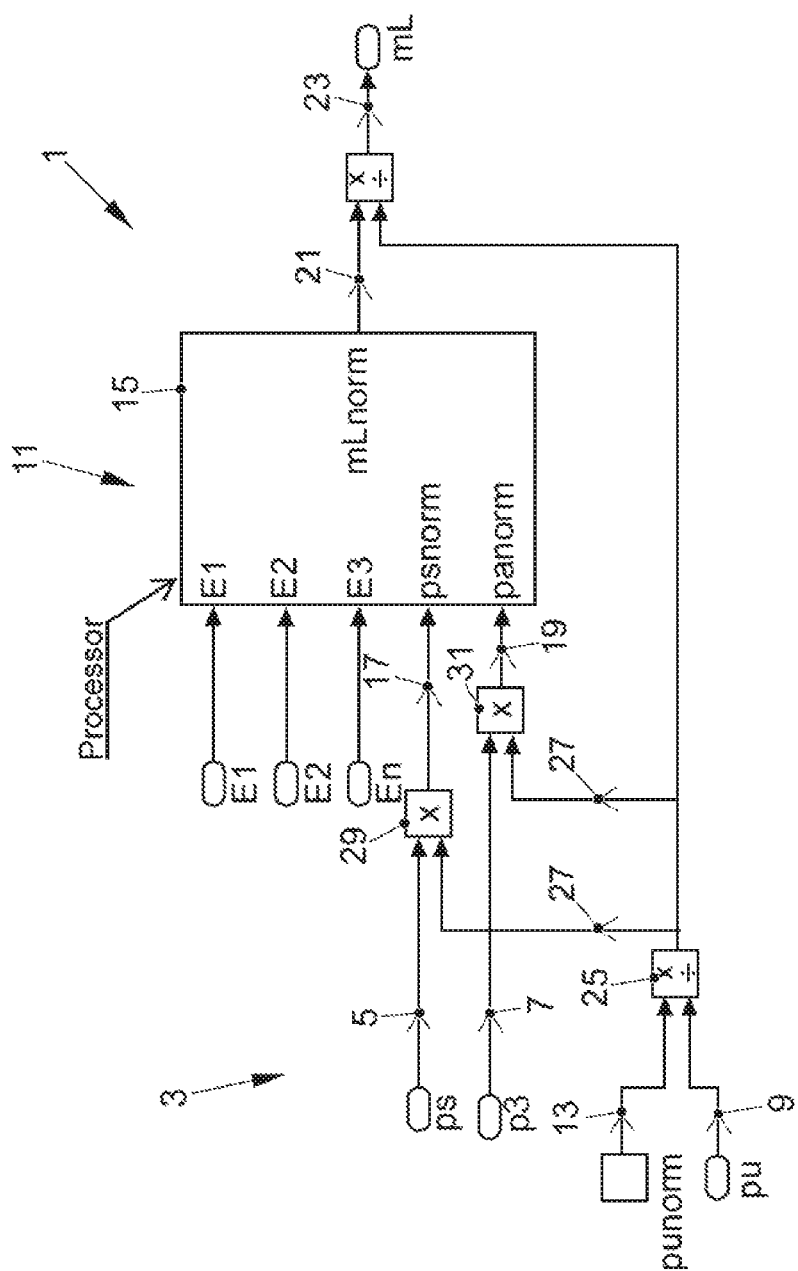
FIG. 1 is a schematic view of a module of an engine control unit according to an embodiment of the invention, which is configured to implement a method for determining a quantity of air within a cylinder of an internal combustion engine according to an embodiment of the invention.

Embodiments in accordance with the invention are directed to a method and a device, in particular an engine control unit, which are capable of determining a cylinder air charge or, respectively, a quantity of air within a cylinder. The equations Eq. 1 to Eq. 7 hereinunder describe physical variables that are useful for determining the quantity of air within the cylinder.

$$mRG_{Res} = \frac{p_3 * V_{AS}}{R_a * T_3} \quad \text{(Eq. 1)}$$

$$mRG_{Reasp} = C * A * p_3 * \sqrt{\frac{1}{T_3} * \psi\left(\frac{p_2}{p_3}\right)} \quad \text{(Eq. 2)}$$

$$mLSca = C * A * p_2 * \sqrt{\frac{1}{T_2} * \psi\left(\frac{p_3}{p_2}\right)} \quad \text{(Eq. 3)}$$

$$p_{RG} = \frac{(mRG_{Res} + mRG_{Reasp} - mLSca) * T_{zyl}}{R_a * V_{ES}} \quad \text{(Eq. 4)}$$

$$p_{zyl} = p2 \quad \text{(Eq. 5)}$$

$$p_L = p_{zyl} - p_{RG} \quad \text{(Eq. 6)}$$

$$mL = \frac{p_L * V_{ES}}{R_a * T_{zyl}} \quad \text{(Eq. 7)}$$

The variables that occur in the equations Eq. 1 to Eq. 7 have the following meaning:
- $mRG_{Res}$: Remaining residual gas
- $mRG_{Reasp}$: Reaspirative residual gas
- $p_2$: Intake manifold pressure
- mLSca: Scavenging air mass
- $p_3$: Exhaust gas pressure
- $T_2$: Temperature intake manifold
- $T_3$: Temperature exhaust gas
- $p_{zyl}$: Cylinder pressure when inlet valve closes
- $T_{zyl}$: Cylinder temperature when inlet valve closes
- $p_{RG}$: Partial pressure residual gas
- $p_L$: Partial pressure air
- $V_{AS}$: Cylinder volume when outlet valve closes
- $V_{ES}$: Cylinder volume when inlet valve closes
- $R_a$: Specific gas constant
- A: Effective area valve overflow
- C: Constant
- mL: Air mass in the cylinder
- pu: Ambient pressure Eq. 1 describes the quantity of residual gas as a function essentially of the exhaust gas pressure $p_3$. The correct determination of the residual gas quantity is a prerequisite for precisely determining the cylinder air charge; it is, however, usually not accessible to direct measurement by a sensor configuration.

The residual gas which remains in the dead volume can be calculated from the corresponding cylinder volume $V_{AS}$, the exhaust gas back pressure $p_3$ and the exhaust gas temperature $T_3$ according to Eq. 1. In the method for the internal recirculation of residual gas or, respectively, the flushing of the quantity of residual gas by fresh air (scavenging), which is customary in the field of spark ignition engines, residual gas or, respectively, fresh air flows through the cylinder between the intake manifold volume and the exhaust gas volume at the top dead center of the intake stroke during the overlapping phase of the opening times of the inlet valve and outlet valve. The quantity of the residual gas over which fresh air has flowed and which is recirculated back into the cylinder in the further course of the air intake tract depends essentially on the pressure ratio between the exhaust gas pressure $p_3$ and the intake manifold pressure $p_2$ according to Eq. 2.

In a similar manner, this applies to the quantity of fresh air which is flushed through the cylinder in the case of positive pressure drops between the intake manifold pressure and the exhaust gas pressure (cf. Eq. 3). It is possible to show (Eq. 4 to Eq. 7) that in the case of uniform scaling of the intake manifold pressure $p_2$ and the exhaust gas back pressure $p_3$ the cylinder air charge mL is also scaled in a linear manner to the same extent.

If, for example in Eq. 1 to Eq. 7, $p_2$, $p_3$ are alternatively written as $p'_2 = f*p_2$ and $p'_3 = s*p_3$, Eq. 7 results in: $mL' = f*mL$. Consequently, the quantity of air which is located in the cylinder in the case of a closed inlet valve is scaled in exactly the same way as the intake manifold pressure $p_2$ and the exhaust gas pressure $p_3$.

Eq. 1 describes the quantity of residual gas when there is a closed outlet valve. In Eq. 2 and Eq. 3 $\Psi$ designates the restrictor discharge function that is provided as $sqrt(k/(k-1)*(x^{2/k} - x^{(k+1)/k}))$, wherein the adiabatic exponent is k. Eq. 5 is based on an approximation that in the case of closing the inlet valve a pressure equilibrium is present between the pressure in the intake manifold and the pressure in the cylinder.

The fact that the intake manifold pressure, exhaust gas back pressure and cylinder air charge scale in the same way in a linear manner is the basis of a proposed method according to the invention for determining a quantity of air within a cylinder of an internal combustion engine.

The method corrects the calculated cylinder air charge in dependence on different ambient pressures pu. In the case of ambient pressures that deviate from the standard conditions, under which the application of the correction fields (correction maps) occurred on the engine test bench, the intake manifold pressure $p_2$ and the exhaust gas back pressure $p_3$ are transformed to the value that would prevail at this engine operating point under standard ambient pressure conditions. The engine was already measured in this hypothetical operating point and the results stored in the corresponding correction fields of the engine control software. The linear back transformation of the cylinder air charge mLnorm, which is calculated from the primary model under standard conditions, is subsequently performed in this hypothetical operation.

FIG. 1 illustrates schematically a module 1 which is embodied so as to implement a method for determining a quantity of air within a cylinder according to an embodiment of the present invention, and which for example can be included in an engine control unit according to an embodiment of the present invention.

The module 1 includes an input module 3 which is configured to obtain at least an intake manifold pressure 5 (also referred to as ps) and an exhaust gas pressure 7 (also referred to as $p_3$) and an actual ambient air pressure 9 (also referred to as pu).

Moreover, the module 1 includes a processor 11 which is configured to scale the intake manifold pressure 5 and the exhaust gas pressure 7 in dependence on the actual ambient air pressure 9 and a standard ambient air pressure 13 (also referred to as punorm), to implement an air charge calculating algorithm 15 which is produced under a standard ambient air pressure operating condition in order to determine a standard quantity of air (mLnorm) 21 on the basis of the scaled intake manifold pressure 17 and the scaled exhaust gas pressure 19.

Moreover, the processor 11 is configured to scale the standard quantity of air 21 (also referred to as mLnorm) in dependence on the actual ambient air pressure 9 and the standard ambient air pressure 13, in order to determine a quantity of air 23 (also referred to as mL) which is located within the cylinder.

For this purpose, a calculating element 25 is used to form a ratio between the standard ambient air pressure 13 (also referred to as punorm) and the actual ambient air pressure 9, wherein the pressure ratio is indicated by reference numeral 27 which can represent a factor f. The intake manifold pressure 5 is multiplied by this factor 27 or, respectively, f by using a multiplication element 29 in order to obtain the scaled intake manifold pressure 17. In the same way, the exhaust gas pressure $p_3$ is multiplied by this factor 27 or, respectively, f by using a multiplication element 31 in order to obtain the scaled exhaust gas pressure 19.

Both the scaled intake manifold pressure 17 as well as the scaled exhaust gas pressure 19 are input variables for the air charge calculating algorithm or, respectively the algorithmic unit 15.

Further input variables are referred to by E1, E2 and En and can include, for example, a rotational speed of the internal combustion engine, an inlet cam position and an outlet cam position or also other input variables.

Figure 2:
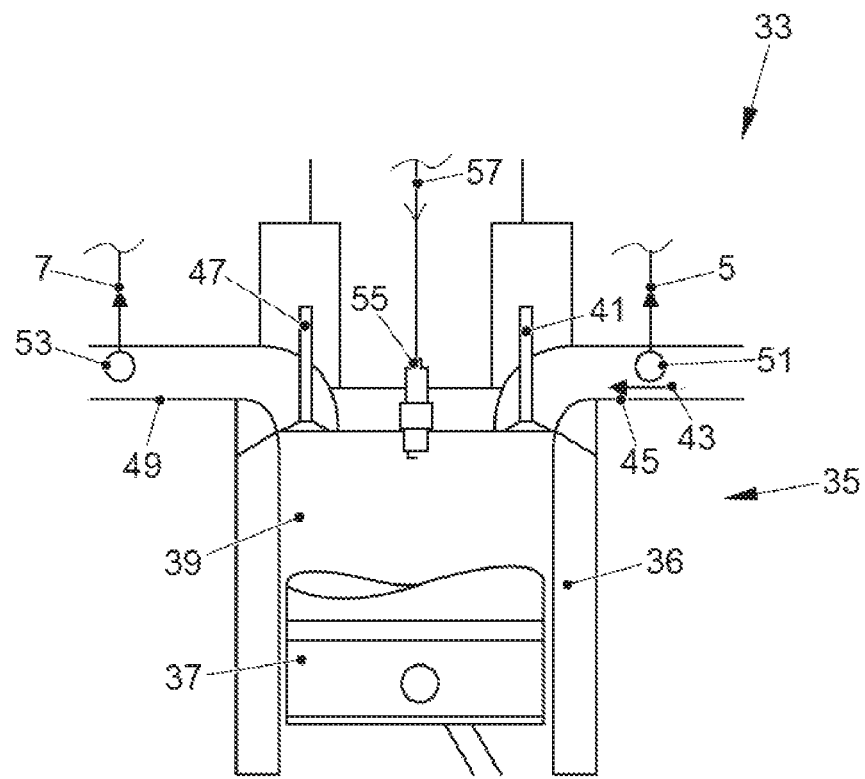
FIG. 2 is a diagrammatic view of a part of an internal combustion engine according to an embodiment of the invention, the internal combustion engine including an engine control unit according to an embodiment of the invention.
Figure 2:
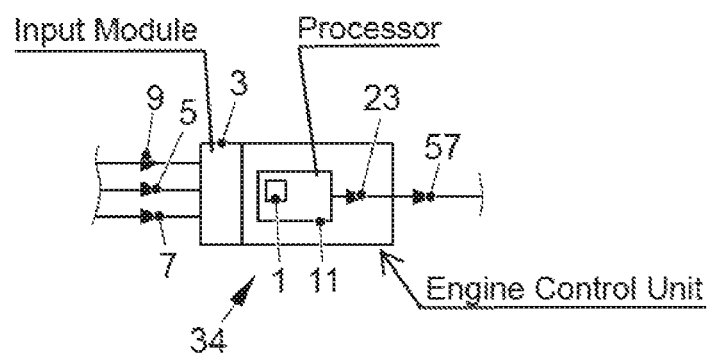

FIG. 2 illustrates schematically a part of an internal combustion engine 33 according to an embodiment of the present invention, the internal combustion engine including an engine control unit 34 according to an embodiment of the present invention, the engine control unit including for example the module 1 which is illustrated in FIG. 1.

A piston 37 is arranged in a cylinder 35 in a displaceable manner along a cylinder axis in a cylinder inner space 39 and during operation (combustion in the cylinder inner space 39) the piston drives a crankshaft via a connecting rod.

The cylinder 35 includes a cylinder wall 36 which delimits the cylinder inner space 39 together with the piston 37. The cylinder 35 includes an inlet valve 41 which makes it possible to introduce air 43 through an intake manifold 45 into the inner space 39 of the cylinder. Moreover, the cylinder 35 includes an outlet valve 47 which makes it possible to conduct exhaust gas from the cylinder inner space 39 into an exhaust pipe 49.

A measuring sensor 51 measures the intake manifold pressure 5 and transmits the intake manifold pressure 5 to the engine control unit 34. A further pressure sensor 53 in the exhaust pipe 49 measures the exhaust gas pressure 7 and transmits the exhaust gas pressure to the engine control unit 34. Moreover, a pressure sensor which is not illustrated in FIG. 2 measures the ambient pressure 9 and feeds the ambient pressure as an input variable to the engine control unit 34. A fuel-air mixture can be ignited within the cylinder inner space 39 by means of a spark plug 55 or optionally without a spark plug, for example by means of compression.

On the basis of the intake manifold pressure 5, the exhaust gas pressure 7 and the ambient air pressure 9, the engine control unit 34 calculates a quantity of air 23 (mL) which is located in the cylinder 35 after closing the inlet valve 41 and uses this determined quantity of air 23 to calculate a quantity of fuel which is to be introduced into the cylinder 35.

The engine control unit 34 can output an injection control signal 57 so as to control an injection device. A quantity of fuel which is calculated in this manner is injected by means of an injection apparatus into the inner space 39 of the cylinder 35. Embodiments of the invention can be applied to internal combustion engines with or without supercharging of the air.

The method according to the invention can make possible a precise calculation of the cylinder air charge even under ambient pressures which deviate from standard conditions.

The method relates to physical corrections such as are evident in Eq. 1 to Eq. 7, and thus includes all drivable operating points.

In contrast to the conventional methods, an adjustment of the calculation of the cylinder air charge (algorithm 15) under different ambient air conditions in individual operating points by adjusting the correction fields in the engine control unit during vehicle testing can be omitted. As a consequence, it is possible to save development time and costs.

At the same engine operating points not only the averaged intake manifold pressures and exhaust gas back pressures scale in a linear manner at different ambient pressures but also the pressure ratio between the intake manifold volume and exhaust gas volume at the point in time of the valve overlap of the valves 41 and 47, the pressure ratio being crucial for the residual gas overflow or, respectively, scavenging.

As a consequence, on the exhaust gas side, the averaged exhaust gas pressure $p_3$ upstream of the outlet valve 47 suffices as an input variable for calculating the cylinder air charge. Further variables such as the measured ambient pressure pu or in the case of supercharged systems the pressure downstream of the turbine are omitted in the primary model 15 for calculating the cylinder air charge.

LIST OF REFERENCE CHARACTERS

1 Calculating module
3 Input module
5 Intake manifold pressure
7 Exhaust gas pressure
9 Ambient air pressure
11 Processor
13 Standard ambient air pressure
15 Air charge calculating algorithm
17 Scaled intake manifold pressure
19 Scaled exhaust gas pressure
21 Standard quantity of air
23 Scaled standard quantity of air
25 Calculating element
29 Calculating element
31 Calculating element
33 Part of an internal combustion engine
34 Engine control unit
35 Cylinder
36 Cylinder wall
37 Piston
39 Cylinder inner space
41 Inlet valve
43 Air
45 Intake manifold or charge pipe
47 Outlet valve
49 Exhaust pipe
51 Pressure sensor
53 Pressure sensor
55 Spark plug
57 Injection control signal

What is claimed is:

1. A method for determining a quantity of air within a cylinder of an internal combustion engine, the method comprising:
    scaling an intake manifold pressure and an exhaust gas pressure in dependence on an actual ambient air pressure and a standard ambient air pressure in order to provide a scaled intake manifold pressure and a scaled exhaust gas pressure;

implementing an air charge calculating algorithm produced under a standard ambient air pressure operating condition, in order to determine a standard quantity of air based on the scaled intake manifold pressure and the scaled exhaust gas pressure; and scaling the standard quantity of air in dependence on the actual ambient air pressure and the standard ambient air pressure in order to calculate the quantity of air within the cylinder of the internal combustion engine.

2. The method according to claim 1, wherein the steps of scaling the intake manifold pressure, the exhaust gas pressure and the standard quantity of air include a linear scaling.

3. The method according to claim 1, wherein the steps of scaling the intake manifold pressure, the exhaust gas pressure and the standard quantity of air include a linear scaling and wherein, in order to calculate the quantity of air within the cylinder, the quantity of air located in the cylinder with the air inlet valve closed is determined.

4. The method according to claim 1, wherein the step of scaling the intake manifold pressure and the exhaust gas pressure is performed in a uniform manner.

5. The method according to claim 1, wherein the step of scaling the intake manifold pressure includes multiplying the intake manifold pressure by a factor, wherein the factor includes a quotient formed from the standard ambient air pressure and the actual ambient air pressure.

6. The method according to claim 4, wherein the step of scaling the standard quantity of air includes multiplying the standard quantity of air by the reciprocal value of the factor.

7. The method according to claim 1, wherein the step of implementing the air charge calculating algorithm includes using at least one input variable selected from the group consisting of positions of actuators affecting a charge, a rotational speed of the internal combustion engine, an inlet cam position, an outlet cam position, a charge movement flap position, at least one valve lift, an exhaust gas temperature, an air supply temperature, a measured exhaust gas pressure downstream of a turbine, a modeled exhaust gas pressure downstream of a turbine and an ambient temperature.

8. The method according to claim 1, wherein, in order to calculate the quantity of air within the cylinder of the internal combustion engine, the method supports a phase of a simultaneous opening of an inlet valve and an outlet valve of the cylinder.

9. The method according to claim 1, wherein, in order to calculate the quantity of air within the cylinder of the internal combustion engine, the method supports a residual gas recirculation.

10. The method according to claim 1, wherein, in order to calculate the quantity of air within the cylinder of the internal combustion engine, the method supports a flushing of a quantity of residual gas with fresh air.

11. The method according to claim 1, wherein the air charge calculating algorithm is a calculating algorithm produced on an internal combustion engine test bench under standard conditions over a plurality of operating points and actuator positions affecting a charge.

12. The method according to claim 1, wherein the air charge calculating algorithm is a calculating algorithm produced on an internal combustion engine test bench at a standard temperature over a plurality of operating points and actuator positions affecting a charge.

13. The method according to claim 1, which comprises determining the intake manifold pressure in an intake manifold and the exhaust gas pressure in an exhaust pipe in each case by one of pressure measurements and modeling operations.

14. The method according to claim 1, which comprises determining the intake manifold pressure in an intake manifold and the exhaust gas pressure in an exhaust pipe in each case by averaging one of pressure measurements and modeling operations.

15. The method according to claim 1, which comprises determining the intake manifold pressure in an intake manifold when an air inlet valve of the cylinder is open and determining the exhaust gas pressure in an exhaust pipe in each case by one of pressure measurements and modeling operations.

16. The method according to claim 1, which comprises determining the intake manifold pressure in an intake manifold and determining the exhaust gas pressure in an exhaust pipe when an exhaust gas outlet valve of the cylinder is open in each case by one of pressure measurements and modeling operations.

17. The method according to claim 1, which comprises obtaining the actual ambient air pressure by performing at least one step selected from the group consisting of measuring a pressure, measuring an altitude and obtaining remotely determined meteorological data.

18. A method for controlling an internal combustion engine having at least one cylinder, the method comprising:
scaling an intake manifold pressure and an exhaust gas pressure in dependence on an actual ambient air pressure and a standard ambient air pressure in order to provide a scaled intake manifold pressure and a scaled exhaust gas pressure;
implementing an air charge calculating algorithm produced under a standard ambient air pressure operating condition, in order to determine a standard quantity of air based on the scaled intake manifold pressure and the scaled exhaust gas pressure;
scaling the standard quantity of air in dependence on the actual ambient air pressure and the standard ambient air pressure in order to calculate a quantity of air within the at least one cylinder of the internal combustion engine; and
supplying fuel into the at least one cylinder, wherein a quantity of fuel is selected based on the quantity of air within the at least one cylinder of the internal combustion engine.

19. An engine control unit, comprising:
an input module configured to obtain at least an intake manifold pressure and an exhaust gas pressure of a cylinder of an internal combustion engine and an actual ambient air pressure;
a processor configured to scale the intake manifold pressure and the exhaust gas pressure in dependence on the actual ambient air pressure and a standard ambient air pressure in order to provide a scaled intake manifold pressure and a scaled exhaust gas pressure;
said processor being configured to implement an air charge calculating algorithm produced under a standard ambient air pressure operating condition, in order to determine a standard quantity of air based on the scaled intake manifold pressure and the scaled exhaust gas pressure;
said processor being configured to scale the standard quantity of air in dependence on the actual ambient air pressure and the standard ambient air pressure in order to determine a quantity of air within the cylinder of the internal combustion engine; and said processor being configured to determine, based on the quantity of air within the cylinder of the internal combustion engine, a quantity of fuel to be introduced into the cylinder of the internal combustion engine.

20. An internal combustion engine, comprising:

at least one cylinder having an intake manifold and an exhaust pipe;

an engine control unit having an input module and a processor;

said input module being configured to obtain at least an intake manifold pressure and an exhaust gas pressure of a cylinder of an internal combustion engine and an actual ambient air pressure;

said processor being configured to scale the intake manifold pressure and the exhaust gas pressure in dependence on the actual ambient air pressure and a standard ambient air pressure in order to provide a scaled intake manifold pressure and a scaled exhaust gas pressure;

said processor being configured to implement an air charge calculating algorithm produced under a standard ambient air pressure operating condition, in order to determine a standard quantity of air based on the scaled intake manifold pressure and the scaled exhaust gas pressure;

said processor being configured to scale the standard quantity of air in dependence on the actual ambient air pressure and the standard ambient air pressure in order to determine a quantity of air within the cylinder of the internal combustion engine; and said processor being configured to determine, based on the quantity of air within the cylinder of the internal combustion engine, a quantity of fuel to be introduced into the cylinder of the internal combustion engine.

* * * * *